Jan. 24, 1967  C. W. AHMER  3,300,204
QUICK ACTING CLAMP MEANS
Original Filed June 5, 1961  2 Sheets-Sheet 1

INVENTOR.
Carl W. Ahmer

Jan. 24, 1967  C. W. AHMER  3,300,204
QUICK ACTING CLAMP MEANS
Original Filed June 5, 1961  2 Sheets-Sheet 2
FIG. 2
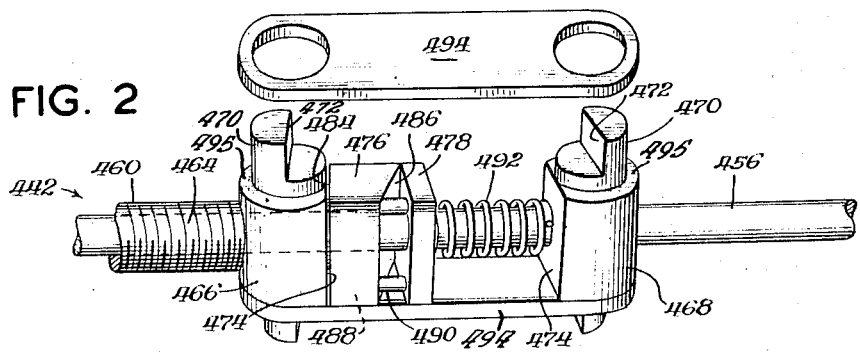
FIG. 3
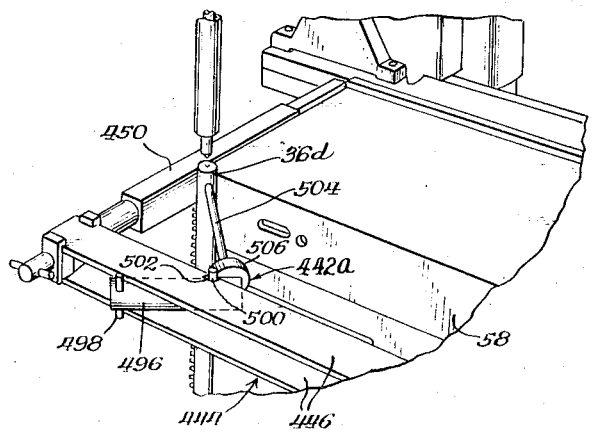
FIG. 5
FIG. 6
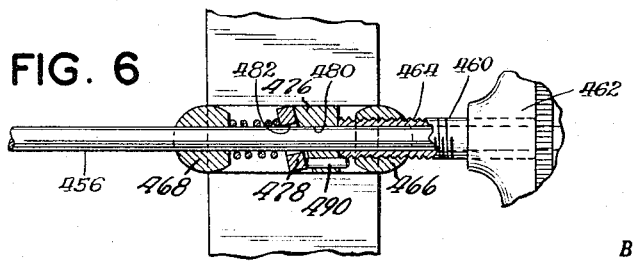
INVENTOR.
Carl W. Ahmer
BY
Horton, Davis
Brewer & Brugman Attys.

3,300,204
QUICK ACTING CLAMP MEANS
Carl W. Ahmer, 1321 Hillside Road,
Northbrook, Ill. 60062
Original application June 5, 1961, Ser. No. 114,977, now Patent No. 3,239,941, dated Mar. 15, 1966. Divided and this application Mar. 29, 1965, Ser. No. 453,237
5 Claims. (Cl. 269—93)

The present application is a division of my application Ser. No. 114,977, filed June 5, 1961, now United States Patent 3,239,941, issued March 15, 1966.

The present invention relates generally to locating points, and marking locations, on a workpiece, and more particularly concerns improved clamp means for holding workpieces during such locating and marking operations as are performed by a machine of the character described and claimed in my aforesaid Patent No. 3,239,941, for example.

An important object of the present invention is to provide a quick locking means for clamping a workpiece in selected positions.

Another object of this invention is to provide improved clamp means which are particularly useful in holding workpieces in place while selecting locations and making markings on various surfaces thereof.

Other objects and advantages of the invention will appear from the following detailed description taken in conjunction with the accompanying drawings in which:

FIG. 2 is a perspective exploded view of a portion of the novel clamp means according to this invention;

FIG. 3 is a perspective view of one corner of the device shown in FIG. 1 and illustrating clamp means for securing a round workpiece in a corner and in position for having a marking operation performed thereon;

FIG. 5 is a sectional view of the quick locking device shown in FIG. 4, but taken on a plane transverse to that of FIG. 4; and FIG. 6 is a view similar to FIG. 5, but showing certain of the elements in different positions.

Figure 1:
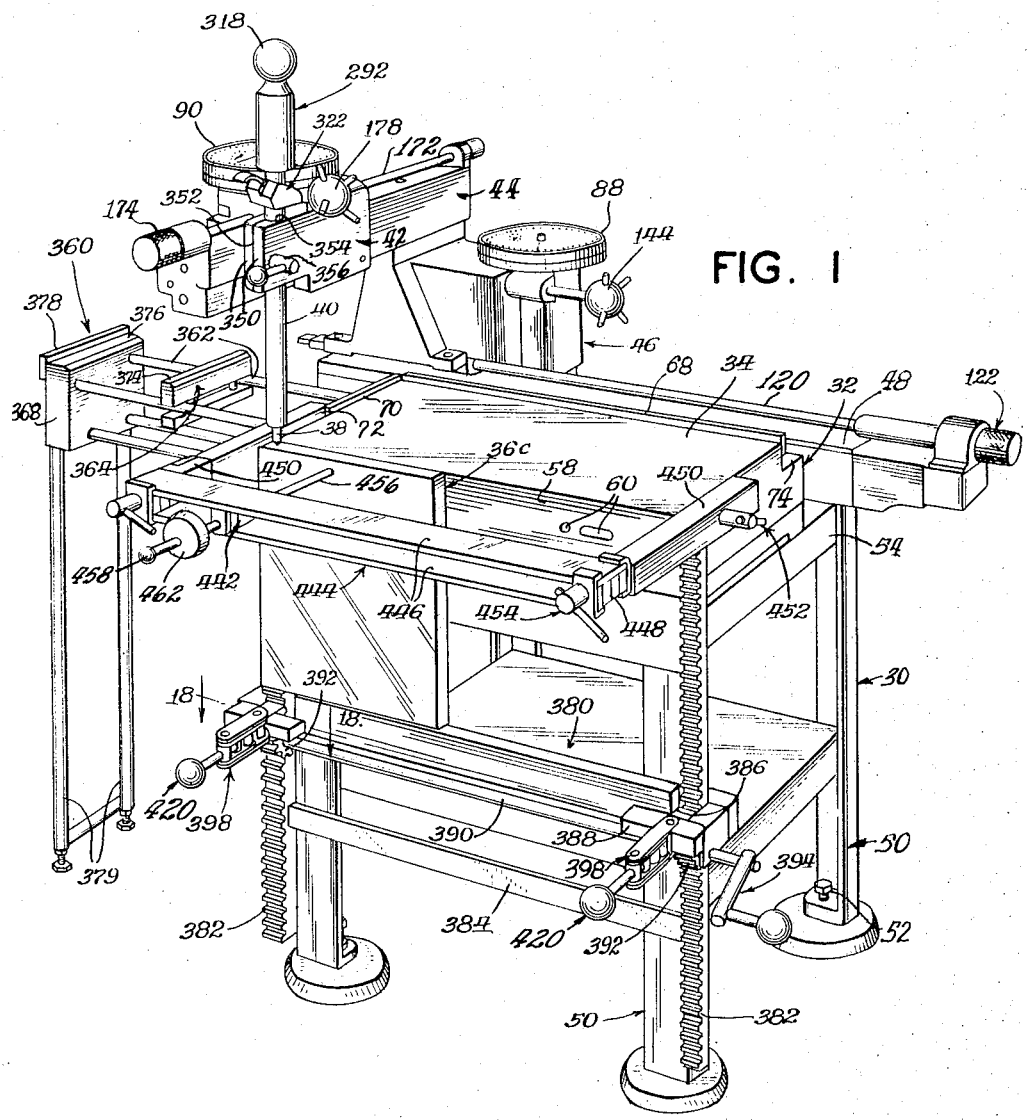
FIG. 1 is a perspective view of a locator and marker device showing the clamp means of the present invention associated therewith.
Figure 4:
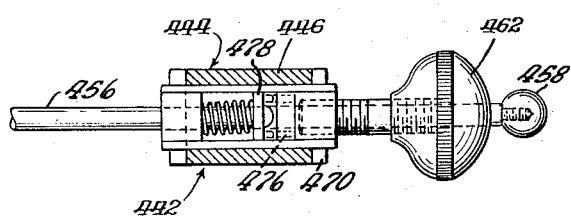
FIG. 4 is a view of the quick locking device shown in FIG. 2, but in relatively end-for-end position relative to FIG. 2.

Referring now to FIG. 1, this figure shows the clamp means of the present invention operationally related to a locator and marker device as more fully described in my Patent No. 3,239,941. In brief the locator and marker device as represented in FIG. 1 includes a table or stand 30 which may be of any suitable construction such as being formed of steel angle pieces and other pieces appropriately welded together to provide the desired strength. Mounted on the table or stand 30 is a table member 32 having a top surface 34 forming a bed for a workpiece on which marking indications are to be made. A center punch 38 is mounted for movement over the bed 34 for universal movement in both horizontal directions for locating it at any desired point over any workpiece placed on the bed, for performing a marking operation thereon.

The punch 38 is mounted in means which will be described in detail hereinbelow, but briefly such mounting means includes a spindle 40 mounted on a carriage 42 which in turn is mounted for longitudinal movement along an arm 44. The arm 44 in turn is supported by another carriage 46 which in turn is mounted for movement longitudinally along an arm 48 supported by the table or stand 30. Thus the movement of the carriages 42 and 46 along mutually transverse lines enables positioning of the punch 38 at any desired location over the bed 34.

Referring now more in detail to the specific elements making up the structure of the device, the stand 30 includes legs 50 provided if desired with securing means 52 for securing the stand solidly to the supporting surface. The stand includes a top element 54 which directly supports the table member 32. The table member 32 is preferably a casting and has such conformations as desired to reduce its total weight while providing the desired strength, in a manner well known in constructing such members. The top or bed 34 on which the workpieces are placed is highly machined for presenting a perfectly flat surface for accurately positioning the workpieces thereon.

The front surface 58 (see FIG. 1) of the table member 32 is provided with openings 60 for purposes more fully described in my said Patent No. 3,239,941 and workpieces may be fitted to the surface 58 (FIG. 1) in a manner described in detail hereinbelow.

The bed 34 may of course be of any desired dimension and proportions, but it is desired that the bed be of such dimensions as to facilitate recognition of multiples thereof, such, for example, as 10″, 20″, etc. In a practical embodiment of the invention, it has been found that the bed 34 may be, for example, 20″ in length (sideways FIG. 1) and 10″ in width (from front to rear FIG. 1).

Secured to each of two mutually perpendicular sides of the table member 32 are coordinate guides 68, 70, and 72. The coordinate guide 68 which may be identified as a long coordinate guide, is secured to the rear surface 74 of the table member by suitable means such as cap screws extended through slotted openings (not shown) in the coordinate guide and threaded into tapped holes in the table member. These slots are elongated in vertical direction to enable the coordinate guide to be lowered without removing the screws, if for example it should be desired for the workpiece to be projected thereover in rearward direction. Normally this coordinate guide is positioned in its fully elevated position shown in FIG. 1 where it provides a stop for abutment by the workpiece to be worked on.

The coordinate guides 70 and 72 together form abutment means along the left end of the table member, being identified as the inner short coordinate guide 70 and the outer short coordinate guide 72. The guide 70 is mounted for movement similarly to the coordinate guide 68 as above described. Preferably the outer short coordinate guide 72 is relatively fixedly mounted, i.e., not adjustable, because this guide is utilized for mounting certain portions of the attachments shown in FIG. 1 as described hereinbelow. The coordinate guide 72 may be secured in place by cap screws. The inner short coordinate guide 70, when lowered to its lowermost position, is flush with or below the top surface or bed 34 to enable the workpiece to be projected over the end of the bed in that direction, as may be a common occurrence as explained more fully hereinbelow.

The carriages 42 and 46 are basically similar to each other, and are described in detail in my Patent 3,239,941. As pointed out above the carriages are mounted for mutually transverse movements along horizontal lines, or along coordinate lines. The punch spindle 40, mounted on the carriage 42, is moved directly by that carriage in directions along one coordinate line, and specifically from front to rear. The carriage 42 and thus the spindle 40 are carried by the other carriage 46 along the other coordinate line and thus moved transversely of the table. These two movements are indicated by dials 90 and 88 which are identical in construction and function.

Locking of the carriage 46 in adjusted position and making micrometric adjustments in the carriage are accomplished by means which includes an adjusting shaft 120 extending longitudinally of the arm 48 and located above that arm. One end of the arm is incorporated in an adjusting nut assembly 122, described in detail hereinbelow, and the other end of the shaft is supported in a bearing. The adjusting shaft 120 is movable longitudinally by manipulation of the adjusting knob 122, and the bearing support accommodates sliding of the adjusting shaft relative thereto.

The carriage 46 may be locked to the adjusting shaft 120, in adjusted position. This is accomplished through the medium of a clamp pin which engages shaft 120 in response to rotation of hand knob 144 (FIG. 1) all as described in my said Patent No. 3,239,941. Associated with the hand 162 is a scale 166 having ten places or space markings such that movement of the hand between each two adjacent space markings indicates one complete revolution of the hand 152. Other than the foregoing description of the dial, the dial may be of any desired construction.

Referring now to the carriage 42 and the associated portions of the device, arm 44 which may be generally solid, has one end rigidly secured to the carriage 46 and extends over the bed 34.

Associated with the arm 44 is an adjusting shaft 172 extending longitudinally of the arm and positioned thereover. This shaft extends through the carriage 42 and is utilized for locking the carriage 42 in adjusted position along the arm 44, and for making micrometric adjustments of the carriage through manipulation of the adjusting screw 174 (FIG. 1) included in an assembly identical with the screw 122 referred to above. Incorporated in the carriage 42 is a clamp screw threaded in a threaded opening in the carriage and having its inner end engageable with a pin which in turn engages the adjusting shaft 172. On the outer end of the clamp screw is a hand knob 178 for use in turning the clamp screw, and for grasping by the operator for moving the carriage 42 to the desired position along the arm 44.

Attention is directed next to the center punch 38, referred to above, as to its construction and function, and its mounting in the carriage 42. The center punch is incorporated in what may be referred to for convenience as a punch assembly 292. The center punch 38, per se, includes a shank portion having a punch point at its lower end, and a head at its upper end. The punch is mounted for vertical reciprocation in the spindle 40 which is generally tubular in form.

The spindle 40 may be of uniform construction and slidably mounted therein is a shaft forming a part of a striker which includes a body secured to the upper end of the shaft by suitable means such as a set screw. A hand-grip knob 318 is mounted on the top of the body and secured thereto by any suitable means.

Mounted on the spindle 40 is a retractor means designated as a whole at 322 (FIG. 1). This retractor means includes a retractor lever of generally U-shaped construction having side arms straddling the spindle 40 and pivotally mounted at their extended ends by means of a pin in a retractor mounting block secured to the spindle 40 by suitable means.

The punch assembly 292 is mounted in the carriage 42 by means of a pair of clamping jaws 350 provided by extensions of the body of the carriage. These jaws are divided by a slit 352 (FIG. 1) and inwardly of this slit define an aperture 354 dimensioned and shaped to receive the spindle 40. A screw clamp means 356 is provided for drawing up the jaws and gripping the punch assembly in adjusted position, the punch assembly being vertically adjustable, the jaws being released upon release of the screw means 356.

In the use of the device, and in order to produce punchings or markings on a workpiece, the workpiece is placed on the bed 34 in position in which it engages the zero coordinate guides, 68 on the rear side, and 70 or 72 or both on the left end. Then guided by the directions for placing the marking, which are calculated and determined from the zero coordinates, the operator moves the carriage 46, to the appropriate position for placing the punch in the desired approximate position. For example, the operator may move the carriage 46 first. Assuming that a point is to be marked on the workpiece and this point is for example 5" from the left end and 4" from the rear edge of table 34. The operator may for example grip the knob 144 on the carriage 46, and loosen it if it should not be loosened at that time, and he moves it along the arm 48 (to the right, FIG. 1) until he finds from observing the dial 88 that the center punch is located approximately 5" from the guide 70. He then tightens the lock means through the knob 144. He then grips the knob 178 on the carriage 42 and performs an operation similar to that just described to position the center punch approximately 4" from the rear guide 68. At this time the center punch is in the region of the intended mark.

The foregoing operations result in a rough or coarse positioning of the center punch but, however, this is very rapidly performed. If the punch is not accurately positioned, as is usually the case when rough adjustments are made, the operator effects fine adjustments through manipulation of the knobs 122 and 174. He then performs the marking operation by lifting the striker and driving it downwardly. This operation is repeated until all of the intended markings are made on the workpiece.

Attention is next directed to FIG. 1 in conjunction with the following description of a table extension utilized for accommodating workpieces longer than the bed 34. Such a table extension is shown at 360 which includes one unit. The extension is such that a plurality, and virtually an unlimited number, of such extensions or increments can be secured to the main device. The extension includes a plurality of rods 362, which in the present instance are four in number, and an intermediate rest 364 secured to the top of the upper pair of rods by a subsidiary plate immediately below those rods and clamped to the rest 364 by cap screws. At their outer ends the rods are secured to a backstop 368 by suitable means such as cap screws. The rods at the inner ends are secured to the end surface of the table member 32 by means of studs threaded in tapped holes in both the table member and the ends of the rods.

In the use of the table extension, the coordinate guide 70 is lowered, as referred to above. The intermediate rest 364 has a top surface 374 which in the proper assembly of the device is on a level with the bed 34 and the backstop 368 similarly has a top surface 376 lying in the same plane. A coordinate guide 378 similar in all material respects to guide 70 is mounted on the backstop 368 for movement to an upper position shown in FIG. 1 for engagement by a workpiece, and to a lower position whereby a workpiece may be placed over that coordinate guide (378) and extended farther out onto a second extension or increment. Legs 379 are provided for supporting the backstop 368 in the desired elevation.

When a workpiece is longer than the bed 34, and particularly when it is substantially longer and includes a multiple of the length of the bed 34, and furthermore when it is desired to make punches or markings in those areas of the workpiece beyond the dimensions of the bed, the table extension 360 will accommodate such workpiece. The coordinate guide 70 is lowered and the workpiece is extended or moved over the table extension until it engages the coordinate guide 378. The table extension 360 preferably is of the same effective dimension as the bed 34, i.e., the distance from the bed to the inner or facing surface of the coordinate guide 378 is exactly equal to the length of the bed 34 which in the present assumed instance is 20". This dimension further facilitates coordination with the scale divisions on the dial 88, which are divided into ten divisions, each indicating an inch. When, for example, the first portion of the workpiece overlying the table and extending throughout the length of the bed, which would be 20″ in length, is marked, and it is desired to mark a successive portion of the workpiece, the workpiece is then extended or moved out over the extension table and butted against the coordinate guide 378 and the desired markings are then performed on the second portion.

The table extension 360 is such that it not only can be secured to the table member 32, but a plurality of such extensions may be provided and each beyond the first connected onto a previously mounted table extension. It will be understood that the number of table extensions may be more than two, and may be limited only by space requirements or other considerations not involved in the present invention.

The locator and marker device described in my Patent 3,239,941 includes another important feature to which the herein claimed invention pertains and that is provision for mounting a workpiece for making markings on surfaces other than the flat sides thereof that would normally be disposed upwardly when the workpiece is lying flat on the bed 34, as for example on the edge surfaces thereof. Two examples of mounting workpieces for so marking them are illustrated in FIGS. 1 and 3. FIG. 1 shows to best advantage the attachments applied to the basic device for accommodating the workpieces in such positions.

Referring first to FIG. 1 a workpiece 36c is shown mounted and clamped in position with a narrow edge thereof disposed upwardly and lying in a plane adjacent the plane of the bed 34. The workpiece 36c rests on a vertical support crossplate 380 on which the workpiece 36c is supported. This crossplate 380 is mounted for vertical adjustment for positioning the workpiece 36c, and any workpiece within the range of sizes permitted, in position with the intended edge surface in or adjacent the plane of the bed 34. The attachments including the crossplate 380 include a pair of vertical racks 382, one adjacent each corner of the front of the machine. These racks may be interconnected by a crosspiece 384 suitably secured to the stand 50 on adjacent elements thereof. The upper end of the racks 382 may be secured by butting them to the end surfaces of the table member 32 and securing them thereto by screws. The crossplate 380 is provided with notches 386 receiving the racks and closed on the front by blocks or plates 388. The crossplate and the blocks 388 together form apertures for journalling a shaft 390 having pinions 392 thereon in mesh with the racks 382. The shaft is provided with a crank 394 for manual manipulation for rotating the shaft and working the pinions on the racks for raising and lowering the crossplate.

A pair of clamp means 398 (FIG. 1) each having an operating handle 420 is provided for clamping the crossplate 380 in vertically adjusted position, one such clamp means being disposed at each end of the crossplate. Each clamp means includes a rack support block having teeth mounted for movement into and out of clamping position in which the teeth engage the associated rack.

In the operation of positioning the crossplate 380, each clamp means 398 is moved to a released position and the crank 394 (FIG. 1) is operated to move the crossplate 380 to the desired vertical position, after which the clamp means 398 are moved to clamped position, holding the crossplate in place as shown in FIG. 1. Infinite degrees of adjustment of the crossplate 380 are not regarded as essential in view of the fact that the upper edge of the workpiece 36c need not be positioned exactly in the plane of the bed 34, but may be displaced therefrom a substantial distance and still be reached by the center punch.

Improved quick-acting clamp means according to the present invention is provided for positively clamping the workpiece 36c in position, as indicated at 442 in FIGS. 1, 2, 4, 5 and 6. This clamp means 442 is mounted on and supported by a clamp bar 444 (FIG. 1) which is made up of a pair of vertically spaced elements 446, secured together at the ends by suitable means and spaced apart by spacer blocks 448. This bar 444 is secured to the table member 32 by a pair of supports 450, one at each end of the table member abutting the end surfaces of that member and secured thereto by suitable means such as quick release screw means 452 (FIG. 1) and other screws (not shown). The bar 444 may be secured to supports 450 by means of quick release screw means 454 (FIG. 1) including screw elements extending through the spacer blocks 448 and threaded into tapped holes in the supports 450.

Referring now to the detailed construction of the clamp means 442 of this invention, such includes a central rod 456 (FIGS. 2–6) which is adapted to directly engage the workpiece 36c at its inner end, and preferably having a knob 458 on its outer end. This rod 456 is freely slidable in a sleeve 460 which is secured at one end to a handle 462 by suitable means such as by threaded engagement, the handle having an aperture to so receive the sleeve and to accommodate passage of the rod 456 therethrough and the other end of the sleeve 460 is threaded at 464, and is thereby connected to one of a pair of similar clamp end members 466 and 468. End member 466 is provided with a tapped transverse aperture to threadedly receive the threaded end of the sleeve while the other end member 468 is provided with a smaller transverse aperture for slidably receiving the rod 456. Each of the members 466, 468 is provided with reduced extensions 470 at each end, provided with interfacing flats 472 lying in planes extending longitudinally of the members. The main body portions of end members 466 and 468 are also provided with interfacing flats 474. Interposed between the end members 466, 468, is a pressure block 476 and a jam plate 478. The pressure block 476 has an aperture 480 slidably receiving the control rod 456 while the jam plate 478 is provided with a central aperture 482 somewhat larger than the rod for enabling the jam plate to cant relative to the rod as explained hereinbelow. The pressure block 476 includes a back surface 484 perpendicular to the axis of the aperture 480 therethrough and a front surface 486 disposed at an angle to the back surface and to the axis of the aperture, while the jam plate 478 may be uniform in thickness, i.e., its opposite faces are both transverse to the central longitudinal axis. The pressure block 476 is provided with longitudinal apertures 488 at one side extending parallel with the axis of the central aperture in which pins 490 are freely slidable therein and engageable with the jam plate 478 and with the surface 474 on the adjacent clamp end member 466. A compression spring 492 is interposed between the jam plate 478 and the end member 468. The clamp means on assembly 442 finally includes a pair of plate links 494 having end apertures fitted over the reduced extensions 470 of the clamp end members and engaging the shoulders formed by the main body portions of those ends. The assembly thus described is fitted in the space between the vertically spaced elements 446 making up the bar 444, and the dimensions and proportions are such that the flats 472 of the end members engage the outer and inner edges of both of these elements 446 and retain the assembly snugly in position in the clamp bar 444 with the assembly and particularly the control rod 456 in accurate alignment perpendicular with the front face 58 (FIG. 1) of the table member 32. The links 494 are engaged by the pressure block 476 and jam plate 478 and thus serve to constrain the same against rotation about the axis of the rod 456.

In the operation of the clamp means 442 the rod 456 is withdrawn or moved to a retracted position, i.e., the inner end of the rod is withdrawn from the surface 58 of the table member a distance sufficient to enable interposition of the workpiece 36c. After positioning the workpiece, the rod 456 is moved forwardly, as it can be done freely, until the inner end thereof engages the workpiece. The knob 458 at the outer end of the rod 456 may be held by either hand and the handle 462 is then rotated to threadingly advance the sleeve 460. In the retracted position of the pressure block (FIG. 2) where the block engages the surface 474 of the end member 466, the pins 490 also engage such surface 474 and when in such position are of such length that the jam plate 478 is disposed accurately transverse to the rod 456. This positions the aperture 482 in jam plate 478 in coaxial relation with the rod 456 to enable free sliding movement of the rod 456 therethrough. In this position the edge of jam plate 478 at the side opposite the pins 490 engages the pressure block 476 at the adjacent thick edge thereof (FIG. 2). Upon threading advance of the sleeve 460 through the clamp end member 466, the pressure blocks 476 is moved forwardly away from surface 474 of end member 466, but the compression spring 492 forces the jam plate relatively rearwardly, i.e., prevents the one side of the jam plate from moving forwardly. This is accomplished by the fact that the pins 490 are freely movable through pressure block 476 to permit the corresponding side of the jam plate, bearing against the pins, to move rearwardly under the urging action of spring 492. Therefore the jam plate eventually assumes a cocked or inclined position as shown in FIG. 6 in which it produces a binding action on the rod 456. The latter rod therefore is securely clamped in position and thus holds the workpiece 36c in position. The movement of the parts in clamp releasing direction are corresponding and opposite in direction, with corresponding opposite function and result.

The clamp means 442 may be moved to any position along the length of the bar 444 to accommodate workpieces of various sizes. This clamp means thus enables secure clamping of the workpiece 36c to the front of the table member 32 in position with any of its edge surfaces disposed upwardly for marking or punching operations. These positions for marking the workpiece 36c are accurately determinable, particularly in view of the selected dimensions of the bed 34, as described above, namely, for example, the front to rear dimension of the bed may be 10" and therefore the location of the desired marking on the workpiece as calculated from a side edge of that workpiece, may be easily calculated relative to the bed 34, and easily determined by observation of the dial 90.

Another feature of this invention is a clamp means for clamping a workpiece such as a round rod 36d as illustrated in FIG. 3. Such clamp means, designated 442a, may include a clamp body 496 positioned between the elements 446 of the clamp bar 444, and provided with a transverse pin 498 at an outer end and another transverse pin 500 at an inner end, the ends of the latter pin on opposite sides of the clamp body being fitted in notches 502 in the inner edges of the elements 446, i.e., the edges opposing the face 58 of the table member. A clamp rod 504 is threaded along its entire length and slidably engaged and guided in a plain hole in the clamp body 496, and its inner end is engageable with the workpiece 36d. A handwheel 506 is mounted on the outer end of the rod 504 and on turning the same, reacting against the clamp body, it forces the rod 504 into clamping engagement with the workpiece. The dimensions and proportions of the clamp means 442a, together with the position of the notches 502 are such that the rod 504 accurately bisects the angle formed by the face 58 of the table 34 and the inner surface of the support 450. The device therefore is effective for clamping workpieces in any position for presenting any of six surfaces upwardly for performing a marking operation thereon. Moreover, nonpolygonal workpieces may be securely clamped in position, such as the round rod forming the workpiece 36d. In view of the fact that clamp means, such as 442, may be infrequently used, this clamp means may be easily removed from the bar 444 by removing the pin 500 from the notches 502 and turning the clamp means to a position with the clamp rod 504 depending downwardly, and with the pin 498 disposed horizontally, and then withdrawing it from the space between the elements 446.

For a fuller and more detailed description and understanding of the present invention particularly as the same relates to its use and operation with a locator and marker device as herein described, as well as for amplification of the detailed features of such a locator and marker device and the environmental relationship of the present invention thereto, reference is hereby made to the full description appearing in my copending application Serial No. 114,977, filed June 5, 1961, now U.S. Patent No. 3,239,941, issued March 15, 1966, of which the present application is a division. Since the present application constitutes a divisional application of its above-identified parent application Serial No. 114,977, all portions of the descriptions and drawings appearing in said parent application and the aforesaid patent issued thereon, which do not appear herein are specifically hereby incorporated in full as part of the present disclosure and description.

It is thought that the invention and its attendant advantages will be understood from the foregoing description, and it will be apparent that various changes may be made in the form, construction and arrangement of the parts without departing from the spirit and scope of the invention or sacrificing all of its material advantages, the form hereinbefore described and illustrated in the drawing being merely a preferred embodiment thereof.

I claim:

1. Clamp means including a pair of spaced clamp end members, each having an aperture therethrough, a sleeve threaded in the aperture of one of the end members and having a handle thereon, a clamping rod slidable through said sleeve and the apertures in said end members, a pressure block adjacent said one of the end members and having a central aperture receiving said central rod, a back surface engageable by said sleeve and with said one of the end members and having an inclined front surface, said pressure block also having longitudinal apertures therethrough with pins slidable therein, a jam plate adjacent said front surface of said pressure block and having a central aperture receiving said rod; said jam plate being engageable with one margin of the front surface of said pressure block and with said pins, said pins being operable when said back surface of the pressure block is engaged with said one of the end members for maintaining the jam plate in perpendicular position relative to the rod, and spring means biasing the jam plate and pressure block toward said one of the end members, said sleeve being operable on being threadingly advanced for forcing the pressure block away from said one of the end members whereby the pins recede relative thereto and enable the jam plate to move relatively out of its perpendicular position toward the inclination of said front surface of the pressure block to provide a clamping engagement between the jam plate and the central rod.

2. The invention set out in claim 1 wherein the central aperture in the jam plate is so dimensioned relative to the central rod that the jam plate assumes a cocked position for producinng a binding or clamping action against the central rod in response to movement of the pressure block such that the space between the back surface of said pressure block and the said one of the end members is less than the length of the pins whereby to prevent loss of the pins from the pressure block.

3. The invention set out in claim 1 wherein links are provided between said clamp end members and have apertures receiving reduced extensions of the end portions of said end members, the pressure block and jam plate are polygonal in shape and said links engage opposite surfaces of the pressure block and jam plate whereby to prevent rotation of the pressure block and jam plate about the longitudinal axis of the central rod.

4. The invention set out in claim 3 in combination with a mounting bar, wherein the mounting bar includes a pair of spaced elements and the clamp end members are positioned between said spaced elements and have portions engaging respectively opposite edge surfaces of both spaced elements of the mounting bar whereby to provide confinement of the clamp means between the elements of the mounting bar and thereby mount the same on the mounting bar, the portions engaging the edge surfaces of the bar elements having sliding engagement therewith whereby to enable sliding movement of the clamp means longitudinally of the mounting bar.

5. Clamp means comprising a pair of end members having interfacing flat surfaces and having reduced extensions at opposite ends of each, the reduced extensions also having interfacing flat surfaces, a first end member having a tapped aperture, a sleeve threadingly mounted in said aperture, a central clamp rod freely slidable in said sleeve and in a reduced aperture in the second end member, a pressure block having a central aperture slidably receiving said clamp rod and having a rear surface perpendicular to said central aperture thereof and engageable with said flat surface of the said first end member and said sleeve, and the pressure block having a forward face inclined to the rear surface, said pressure block also having additional apertures therethrough parallel with its central aperture, pins in said additional apertures and freely slidable therein, a jam plate having a central aperture receiving said clamp rod and engaging said pins and said forward face at the thick side of the pressure block, said pins being substantially the same length as the longitudinal dimension of the thick side of the pressure block, a compression spring interposed between the jam plate and the second end member, and links having end apertures receiving the reduced extensions on the end members and when so assembled with the end members engaging the pressure block and jam plate and constraining them against rotation about the axis of the clamp rod, said sleeve being threadable through the tapped aperture in the first end member and thereby operable for engaging and advancing the pressure block whereupon as the rear face of the latter separates from the flat surface on said first end member and the pins remain in engagement with that flat surface under the action of the jam plate and spring, the jam plate thereupon being operative for cocking relative to the clamp rod and producing a clamping action on the clamp rod.

References Cited by the Examiner
UNITED STATES PATENTS

| | | | |
|---|---|---|---|
| 1,283,192 | 10/1918 | Hughes | 269—167 |
| 2,424,313 | 7/1947 | Heinrick | 269—169 X |
| 2,498,870 | 2/1950 | Armitage et al. | 74—441 |
| 2,615,348 | 10/1952 | Gasser | 74—441 |
| 2,735,323 | 2/1956 | Philips | 269—167 |
| 3,096,975 | 7/1963 | Irwin | 269—169 |

ROBERT C. RIORDON, *Primary Examiner.*

B. S. MOWRY, *Assistant Examiner.*